United States Patent [19]
Martin

[11] Patent Number: 4,934,825
[45] Date of Patent: Jun. 19, 1990

[54] PROPELLER PHASE CONTROL APPARATUS

[75] Inventor: Anthony N. Martin, Simsbury, Conn.

[73] Assignee: United Technologies Corporation, Hartford, Conn.

[21] Appl. No.: 136,798

[22] Filed: Dec. 22, 1987

[51] Int. Cl.$^5$ .......................................... B64C 11/50
[52] U.S. Cl. .............................. 364/431.01; 416/34; 416/35; 60/702
[58] Field of Search ................... 364/431.01, 431.02; 60/702; 416/33, 34, 35; 73/660; 324/83 A; 328/133

[56] References Cited

U.S. PATENT DOCUMENTS

| | | | |
|---|---|---|---|
| 3,367,110 | 2/1968 | Leeson, Jr. | 60/702 |
| 3,479,822 | 11/1969 | Nelson et al. | 416/34 |
| 3,589,832 | 6/1971 | Harris | 416/34 |
| 3,689,175 | 9/1970 | Hartzell et al. | 60/702 |
| 3,984,986 | 10/1976 | Reas | 60/702 |
| 3,986,363 | 10/1976 | Beaman et al. | 60/702 |
| 4,236,115 | 11/1980 | Nelson | 328/133 |
| 4,245,955 | 1/1981 | Lambertson | 416/34 |
| 4,412,422 | 11/1983 | Rossi | 60/706 |
| 4,653,981 | 3/1987 | Harner et al. | 416/34 |
| 4,659,283 | 4/1987 | Niessen et al. | 416/34 |

Primary Examiner—Thomas G. Black
Attorney, Agent, or Firm—Dominic J. Chiantera

[57] ABSTRACT

Propeller phase control apparatus for use on multi-engine aircraft having, for each engine, an electronic engine control (EEC) for providing an EEC command speed and phase (S/P) signal to control propeller phase and shaft speed, and a speed and phase control (SPC) for regulating the propeller's blade pitch angle to adjust the shaft speed thereof in dependence on the EEC command S/P signal value, includes: a SYNCHROPHASER Reference Unit (SRU) having a signal processor with signal memory, the memory including stored signals definitive of a speed and phase algorithm, the signal processor calculating a common SRU command S/P signal value for all SPCs in accordance with the algorithm and in dependence on the sensed values of selected flight data indicative of engine performance, and further includes an electronic switch for each SPC, for selecting either the SRU command S/P signal of the engine's EEC command S/P signal for presentation to the SPC.

3 Claims, 3 Drawing Sheets

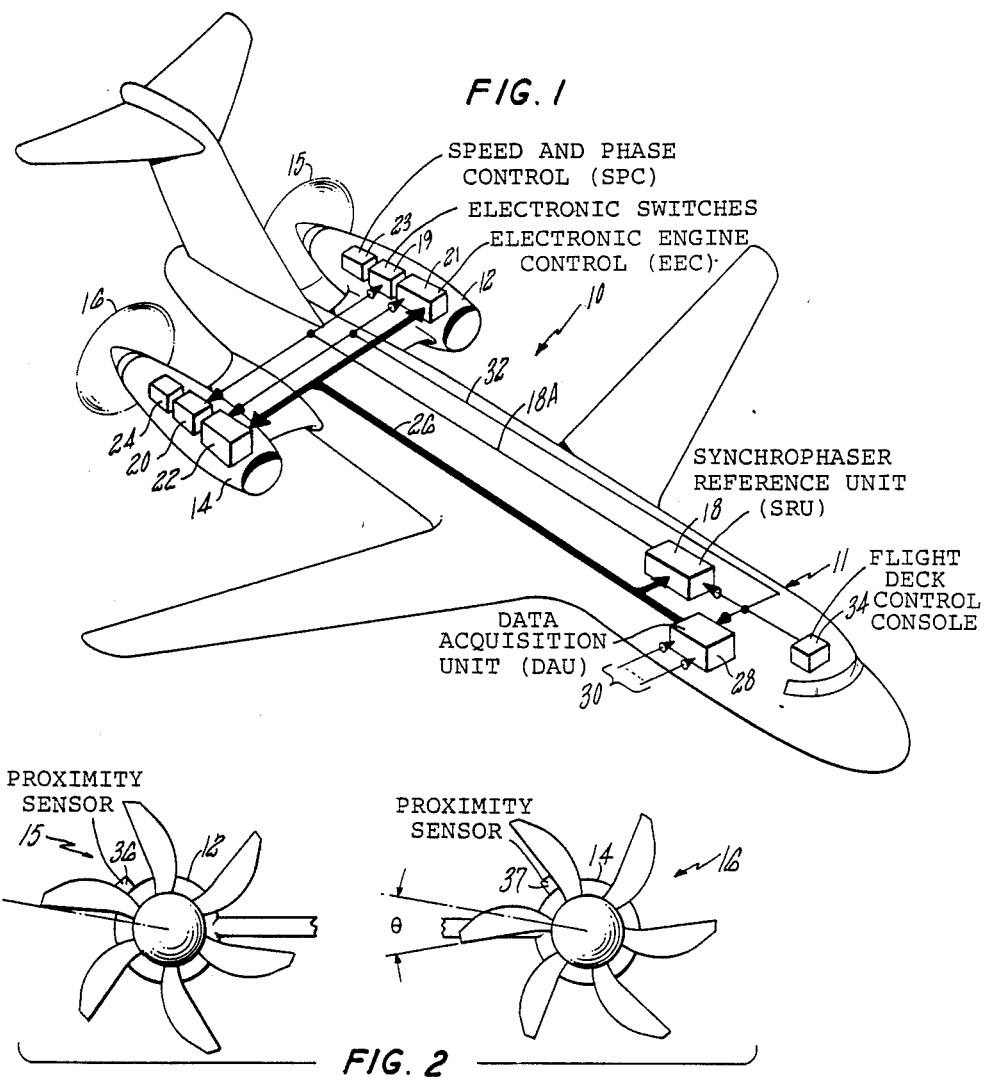
FIG. 1
FIG. 2
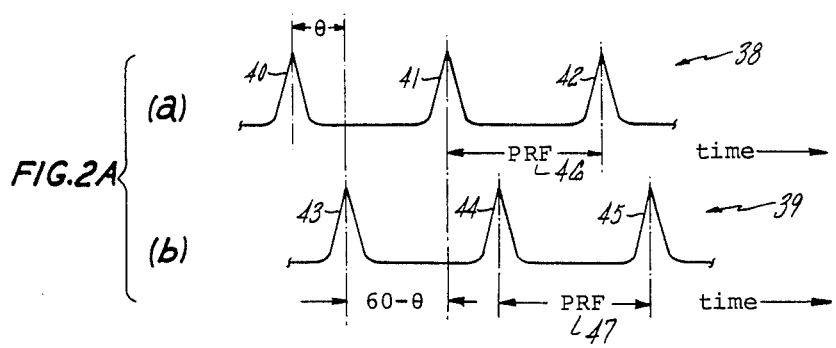
FIG. 2A

PROPELLER PHASE CONTROL APPARATUS

TECHNICAL FIELD

This invention relates to propeller aircraft, and more particularly to apparatus for synchronizing the rotational phase of propellers on multi-engine aircraft.

BACKGROUND ART

As well known, SYNCHROPHASER ® phase control devices (SYNCHROPHASER is a registered trademark of United Technologies Corporation) are used to maintain a relative phase relationship between propellers on multi-engine aircraft. The relative phase value is selected for each aircraft, and is maintained at a near constant value during flight to minimize acoustic cabin noise resulting from random striking of the fuselage by airflow disturbances produced by asynchronous propeller rotation.

The prior art SYNCHROPHASER phase controls use a master/slave protocol. The phase control maintains the instantaneous spatial position of the blades of each slave engine propeller in dependence on the sensed blade position of a designated master engine propeller. The sensed position of each slave propeller is compared with the sensed position of the master propeller to detect a difference phase value. The blade pitch angle of each slave propeller is then adjusted to establish the desired phase difference value.

Phase synchronization is achieved by a momentary (or possibly fixed) change in the slave propeller shaft speed. As known, the shaft speed of a propeller may be changed by changing the propeller blade pitch angle in the presence of a constant engine power level. An increase in the blade pitch angle increases the blade power absorption and reduces propeller speed. A decreases in blade pitch angle reduces power absorption and increases propeller speed. The phase control changes the blade pitch angle constantly, making constant adjustments in the shaft speed of each slave engine to maintain phase synchronization of each slave propeller with the master propeller.

The master/slave protocol, while acceptable to small business aircraft manufacturers (commuter or business), is not permitted by some of the large commercial aircraft manufacturers since to some it is viewed as a "cross coupling of engine functions". In the master/slave SYNCHROPHASER control scheme there is the inherent possibility of engine faults (including those not related to the SYNCHROPHASER control) in a reduced engine power direction. In the event of master engine degradation the SYNCHROPHASER control may pull down performance of the slave engines.

Although all such phase controls have only a limited control range of authority within which pull down may occur (typically +/−4.0 % of set speed), this is still considered as a significant reduction in the margin of safety for the approach and landing flight modes. It is desirable, therefore, to perform the phase synchronization function without this interdependency between slave and master engines.

DISCLOSURE OF INVENTION

The object of the present invention is to eliminate the master/slave control relationship in a propeller phase control by comparing the sensed blade position and propeller shaft speed of each engine to an independent phase and speed reference signal calculated from the sensed values of selected flight parameters. This reference is not influenced by actual engine speed, thereby eliminating the potential for cross coupling and power draw-down.

According to the present invention, propeller phase control apparatus for use on multi-engine aircraft having, for each engine, an electronic engine control (EEC) for providing an EEC command speed and phase (S/P) signal, and a speed and phase control (SPC) for regulating the propeller's blade pitch angle to adjust the shaft speed thereof in dependence on the EEC command S/P signal value, includes: a SYNCHROPHASER Reference Unit (SRU) having a signal processor with a signal memory including therein stored signals defining a speed and phase algorithm, the signal processor calculating a common SRU command S/P signal for all SPCs in accordance with the algorithm and in dependence on the sensed values of selected flight data indicative of engine performance, and further includes an electronic switch for each SPC for selecting either the SRU S/P signal or the engine's EEC S/P signal for presentation to the SPC.

In further accord with the present invention, the SRU S/P signal is provided in a pulsed signal format in which each pulse real time value is an indication of desired propeller blade position, and the pulse repetition frequency (PRF) is indicative of desired shaft RPM. In still further accord with the present invention, the SRU is responsive to flight data indicative of engine rating demands, engine throttle lever angle (TLA) setting, and sensed engine and aircraft operating conditions.

The present invention controls propeller phase without the cross coupling of engine functions, thereby eliminating the possibility of a cross coupling failure mode of the aircraft's phase control apparatus. An independent SRU command speed and phase signal is provided through use of known electronic engine control (EEC) algorithms.

To ensure safety, the phase control apparatus apparatus is deactivated in the presence of detected system faults, or if the sensed flight data indicates that improper phase control conditions exist, i.e. one engine is set at a much different power setting from the others. The system may be architecturally configured at the same level of redundancy and self-test as the aircraft's EEC systems, thereby providing the highest degree of reliability performance.

These and other objects, features and advantages of the present invention will become more apparent in light of the following detailed description of a best mode embodiment thereof, as illustrated in the accompanying drawing.

BRIEF DESCRIPTION OF DRAWING

FIG. 1 is a figurative illustration showing installation of the present apparatus in a propeller driven aircraft;

FIG. 2 illustrates the concept of propeller phasing, as used in the description of the invention;

FIG. 2A is a waveform illustration used in the description of FIG. 2;

BEST MODE FOR CARRYING OUT THE INVENTION

Figure 4:
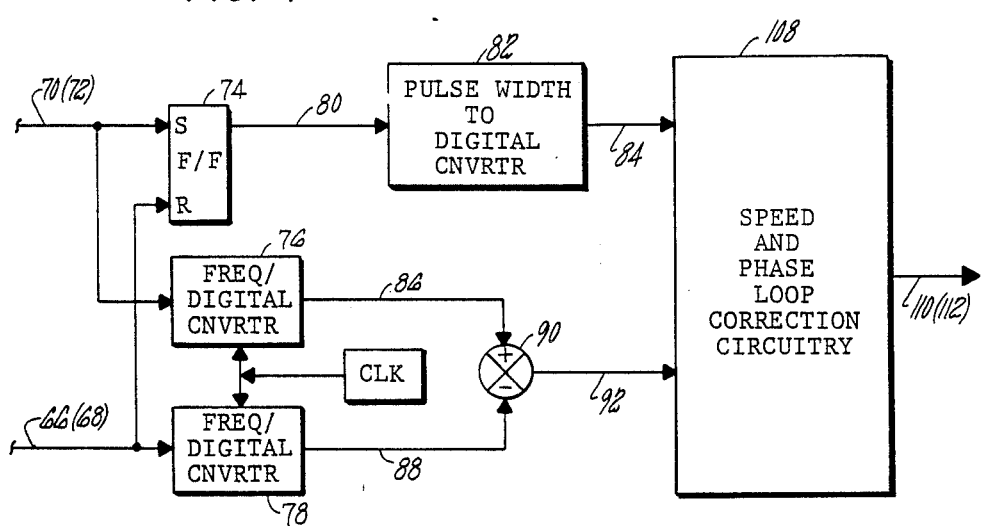
FIG. 4 is a schematic block diagram of one of the elements illustrated in FIG. 3.

FIG. 1 illustrates, in figurative fashion, the use of the present phase control apparatus 10 in a rear engine, propeller driven aircraft 11 having port and starboard engines 12, 14. Each engine includes propellers 15, 16 having an N number of blades (not shown). The propeller and engine combination is that generally referred to as either a Propfan, an Unducted Fan (UDF), or an Ultra High Bypass (UHB) propulsor. The engines may have more than one set of propellers arranged in counterrotating fashion.

In the present description it is assumed that the propeller, or variable pitch fan in the case of that class of engine designated as a "Propfan", has a fixed speed relationship to one of the engine shafts; the speed of this shaft being referred to as engine shaft speed. Similarly, as may be obvious to those skilled in the art, although the invention is described with respect to a dual engine—single propeller combination, it is equally applicable to multi—propeller engines (including counterrotating configurations) and to higher numbered multi-engined aircraft.

The phase control apparatus includes a SYNCHROPHASER reference unit (SRU) 18 connected through lines 18A to electronic switches 19, 20 associated with the port and starboard engines. The switches are interconnected between the associated engine's electronic engine control (EEC) 21, 22 and speed and phase control (SPC) 23, 24. The EECs 21, 22 and SPCs 23, 24 are prior art control devices which are resident on the aircraft. Although each may be adapted to function with the present SYNCHROPHASER system, they are not part of the present invention. Similarly, for simplicity, those engine control elements necessary for complete engine control but which do not function with the present invention, are not shown.

The SRU 18 and EECs 21, 22 receive selected flight data provided on the aircraft data bus 26 by the aircraft's data acquisition unit (DAU) 28 from data sensors 30 (not shown) installed throughout the aircraft. The SRU and EECs also receive throttle lever angle (TLA) sensed position information on line 32 from the flight deck control console 34. As described in detail hereinafter with respect to FIG. 3, the SPCs 23, 24 provide blade pitch angle command signals to each engine's pitch control unit (PCU, not shown in FIG. 1).

As known to those skilled in the art, the PCUs regulate the propeller's blade pitch angle to set the propeller's actual shaft speed to the command S/P signal value. The propeller's actual phase and speed is determined by sensing the position and RPM of the propeller blades with respect to a reference point along the blade rotational path.

FIG. 2 is a rear view of the engines 12, 14, broken away from the aircraft. It illustrates the propeller blade detail. The propellers shown have six (N=6) blades. Each engine includes a proximity sensor 36, 37 disposed on the engine casing, within the blade sweep path. Passage of the blades in proximity to the sensor produces a pulsed signal output. The pulse repetition frequency (PRF) of the sensor output is directly proportional to blade RPM:

$$\frac{\text{pulse}}{\text{second}} \times \frac{\text{revolutions}}{\text{pulse}} \times \frac{\text{seconds}}{\text{minute}} = \text{RPM}$$

Since the sensor reference point is fixed, the real time pulses provide an indication of the instantaneous position of the blades. Therefore, the sensor output provides speed information and, when compared with the sensor output from the opposite engine, the time difference between time proximate pulses in each output provides relative phase information between propellers.

FIG. 2A, illustrations (a) and (b) show the proximity sensor output waveforms 38, 39 for the propellers 16 and 15. Since FIG. 2 illustrates propeller 16 as either $\phi$ degrees ahead ("leading"), or (360/N -$\phi$) degrees behind ("lagging") propeller 15, FIG. 2A shows the pulses 40-42 (propeller 16 waveform 38) and the pulses, 43-45 (propeller 15 waveform 39) to be out of phase. The pulse 40 leads the pulse 43 by $\phi$ degrees and pulse 41 lags pulse 43 by (60 - 0) degrees. The pulse repetition periods (PRPs) 46, 47 of the two waveforms indicate the sensor PRF, which is directly proportional to the propeller shaft speed (RPM).

Figure 3:
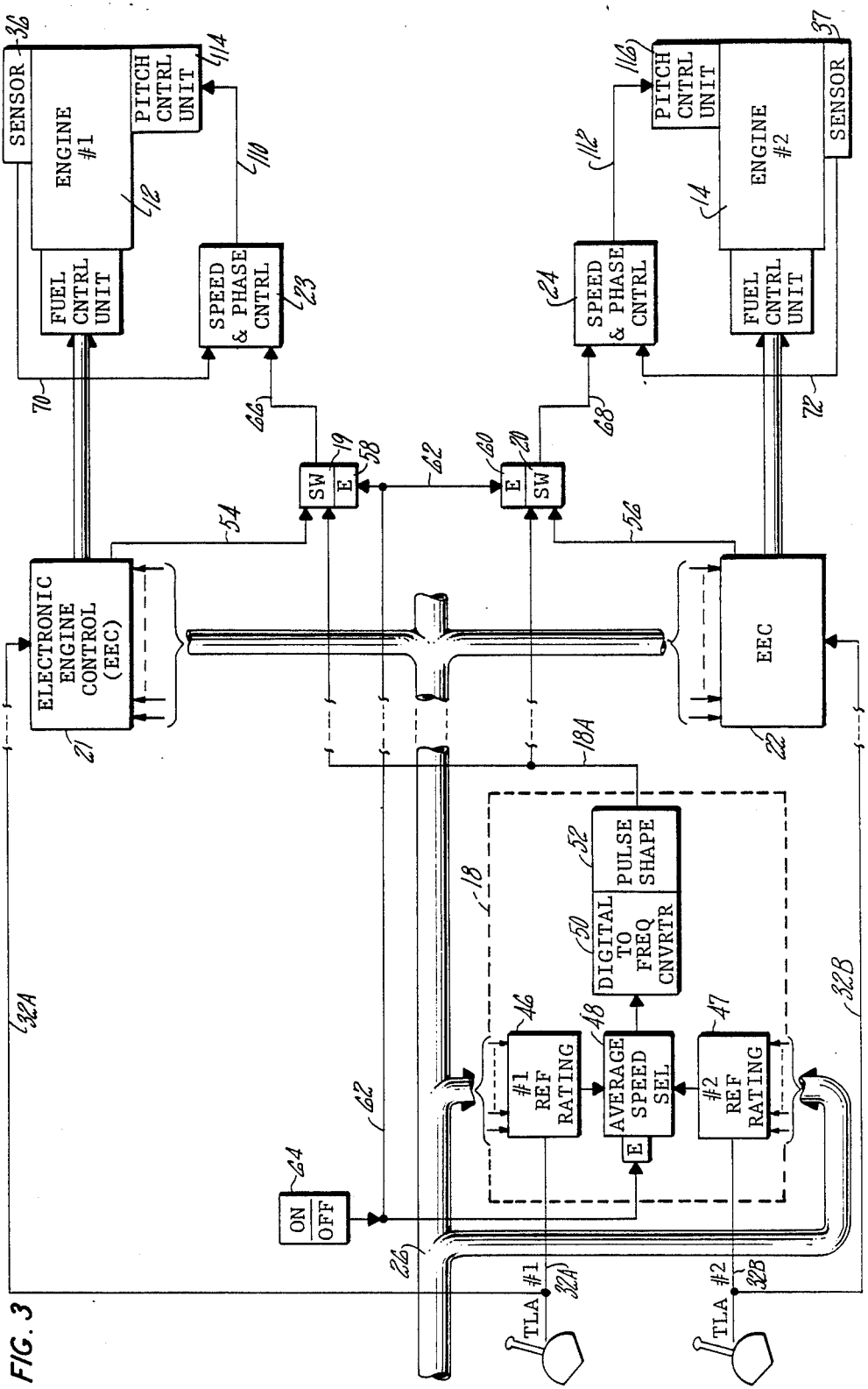
FIG. 3 is a schematic block diagram of the phase control apparatus illustrated in FIG. 1.

FIG. 3 is a schematic block diagram of the present system 10 as used in conjunction with the related engine control elements. The elements of FIG. 2 which are common to FIG. 1 are given the same reference numerals. For ease of description, the port and starboard engines (12, 14) are labeled engine #1 and engine #2, respectively. To emphasize, where necessary, the association of certain elements to a particular engine, the #1 and #2 indicators are also used in connection with those elements.

The SRU 18 includes first (#1) and second (#2) reference rating units 46, 47 which calculate individual reference S/P signal values for each engine. These values are the desired shaft speed and phase for each propeller under the prevailing sensed aircraft operating conditions and TLA setting for each engine. The individual S/P values are calculated using the same input data and program schedule algorithms as that used by each engine's EEC to provide the EEC command S/P signal for controlling the engine's turbine speed.

The exact type of flight data required for each reference speed unit may vary with engine type. In general it includes the TLA settings, the engine rating demands, the engine operating conditions, flight mode data (take-off, climb, cruise, etc.), and the sensed values of: aircraft speed (M#), outside air pressure ($P_0$), and air temperature ($T_0$). The reference speed units receive the TLA settings (TLA #1, TLA #2) on lines 32A, 32B.

The individual reference speed signals typically differ in value due to signal tolerances and differences in the TLA positions. To provide a common value command S/P signal, the individual reference speed values are combined. In the best mode embodiment the combination occurs as the average of the individual speed signals. It should be understood, however, that any other manner of combination, such as a maximum value select or a minimum value select may be used, as deemed necessary for a particular application by those skilled in the art.

In FIG. 3 the calculated speed signals are presented to an SRU averaging circuit 48 which provides the average of the two calculated speed values. The averaged value represents a shaft speed which, if applied to both engines, would give approximately the same total aircraft thrust as the two individually calculated reference speed values.

The average speed signal is presented to digital-to-frequency converter circuitry 50 which converts the average speed value to a pulsed signal having an N number of pulses per propeller revolution (N=6 in the present description) and having a PRF corresponding to that of an N bladed propeller rotating at the command speed (RPM). It thereby becomes a phase reference signal, fixed in time, as well as a speed reference signal. The serial pulse signal is shaped in conditioning circuitry 52 and presented on line 18A as the SRU command S/P signal to the electronic switches 19, 20.

Each of the switches 19, 20 receive the SRU command S/P signal at a first input, and receive at a second input the EEC command S/P signal on lines 54, 56 from the EECs 21, 22. The EEC command signal is in the same pulsed signal format as the SRU signal. The EEC command signal value is equal to the individual reference signal values calculated in the SRU reference rating units 46, 47 to the extent permitted by tolerances and the effect of the combining (averaging in the best mode embodiment) of the individual signal values.

The switches 19, 20 are a gated (enable), double throw electronic switch, of a type well known in the art. Each switch has an enable (E) gate input 58, 60 for receiving an SRU ENABLE gate signal on lines 62 from an operator select switch 64 located on the aircraft's flight deck. When enabled, each switch selects the SRU command S/P signal on the lines 18A for presentation on output lines 66, 68 to the related SPCs 23, 24. When disabled, each selects the EEC command S/P signal on lines 54, 56 for presentation to the SPCs. The SRU is normally on, i.e. the switches enabled, but may be disabled automatically (not shown) if the aircraft system self test function indicates a fault.

In addition to receiving the switch selected command S/P signal, each SPC receives the sensed actual blade position and shaft RPM values on lines 70, 72 from the engine mounted proximity sensors 36, 37. Each SPC compares the sensed RPM signal with the command speed and phase signal to detect a speed and phase difference magnitude. FIG. 4 is a schematic block diagram of a typical SPC 23 (24). The sensed position and phase signal on lines 70 (72) and the command S/P signal on lines 66 (68) are each presented to the SET and RESET inputs of a flip-flop 74 and to individual ones of a frequency to digital converter 76, 78. The pulse width of the flip-flop output signal on line 80 provides an indication of the phase difference magnitude. The pulse width is converted in digital converter 82 which provides a digital word equivalent of the phase difference on lines 84.

The converters 76, 78 each provide conversion of the pulsed signals PRF into a digital word on output lines 86, 88, which are presented to the +/− inputs of a summing junction 90. The junction subtracts the two signals to provide a digital speed error signal on lines 92, indicative of the difference speed magnitude between the command and sensed values.

Figure 5:
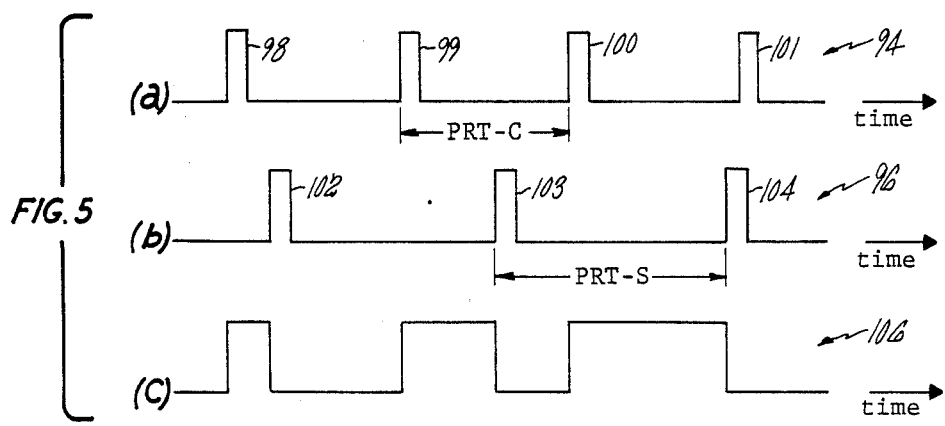
FIG. 5 illustrates waveforms used in the description of FIGS. 3 and 4.

FIG. 5, illustrations (a), (b) exemplify the command and sensed signal waveforms 94, 96, each with pulses 98–101 and 102–104, respectively. The pulse repetition time for the command signal (PRT-C) is shown to be shorter than that (PRT-S) for the sensed signal indicating a higher command speed. Similarly, the real time difference phase magnitude between pulses 98 and 102, 99 and 103, and 100 and 104, is shown by the signal waveform 106 of illustration (c).

The difference signal magnitudes on lines 84, 92 are presented to the speed and phase loop correction circuitry 108. As known to those skilled in the art, the correction circuitry provides the proper gain shaping and scaling to the speed and phase error signals within separate speed and phase loops, to provide a command blade pitch angle signal on output lines 110 (112) to the engine's PCUs 114, 116 (FIG. 1).

The PCUs change the blade pitch angle to adjust the engine #1, engine #2 propeller shaft speeds. Since the speed correction loop is faster (seconds) than the phase loop (minutes), speed correction occurs first. The corrected speed may then be further adjusted to provide the desired relative phase.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. Apparatus for controlling the relative phase between propellers of a multi-engine aircraft having, for each engine, a speed and phase control (SPC) unit and an electronic engine control (EEC) unit, the SPC unit controlling the propeller blade pitch angle in dependence on a difference magnitude between the spatial positioning of the signal pulses of a pulsed command speed and phase (S/P) signal from the EEC unit and that of a sensed pulse signal indicative of the propeller's actual blade positioning, the SPC unit controlling propeller shaft speed in dependence on a difference magnitude of each S/P signal's pulse repetition frequency (PRF), the EEC unit calculating the EEC pulsed command S/P signal spatial positioning of pulses and the PRF using a model algorithm responsive to the magnitude of sensed flight data signals received from an aircraft data bus and on throttle lever angle (TLA) position signals from the aircraft flight deck, comprising:

SYNCHROPHASER Reference Unit (SRU) means, including signal processing means having signal memory means for storing signals definitive of the model algorithm used in the EEC unit, said signal processing means being responsive to the sensed flight data signals and TLA position signal information presented to the EEC unit, for calculating a SRU command S/P signal value having a desired pulse spatial positioning and a desired PRF; and switch means associated with each SPC unit for selecting, alternately in dependence on operator control, said SRU command S/P signal or the associated engine's EEC command S/P signal for presentation to the SPC unit.

2. The apparatus of claim 1, wherein the spatial position of the signal pulses of said SRU command S/P signal correspond to the desired spatial position of the blades of each propeller.

3. The apparatus of claim 1, wherein said SRU means comprises:

reference rating unit means, one for each aircraft engine, each including signal processing means having signal memory means for storing signals definitive of the model algorithm used in the EEC unit, said reference rating units each being responsive to the sensed flight data signals and to the TLA position signals presented to the associated engine's EEC unit for calculating, in a digital signal format, a reference rating unit S/P signal associated with each engine;

average speed select means, responsive to all said reference rating unit S/P signals for providing said SRU command S/P signal in digital signal format as the average value of the calculated spatial position and the calculated PRF of all of said reference unit S/P signals; and means for converting said digital format SRU command S/P signal to a pulsed signal format for presentation to said switch means.

* * * * *